United States Patent [19]

Tsutsui

[11] 4,342,237
[45] Aug. 3, 1982

[54] FEEDING APPARATUS FOR MACHINE TOOLS

[75] Inventor: Kikuo Tsutsui, Isehara, Japan

[73] Assignee: Amada Company, Limited, Kanagawa, Japan

[21] Appl. No.: 180,432

[22] Filed: Aug. 22, 1980

[30] Foreign Application Priority Data

Aug. 17, 1979 [JP] Japan .................. 54-104043

[51] Int. Cl.³ .......................................... F16D 67/00
[52] U.S. Cl. ................................. 74/625; 74/483 R; 192/0.02 R; 192/3.63; 192/48.1
[58] Field of Search ............... 192/0.02 R, 3.63, 95, 192/48.1; 74/625, 483 R, 878

[56] References Cited

U.S. PATENT DOCUMENTS

| | | | |
|---|---|---|---|
| 1,255,600 | 2/1918 | Hanson | 74/625 |
| 2,608,109 | 8/1952 | Hoelscher | 74/625 |
| 2,648,984 | 8/1953 | Olander | 192/93 R |
| 3,309,942 | 3/1967 | Caldwell | 74/625 |
| 3,341,156 | 9/1967 | Hirshson | 74/483 |

FOREIGN PATENT DOCUMENTS

| | | | |
|---|---|---|---|
| 761858 | 8/1954 | Fed. Rep. of Germany | 74/483 |
| 1366091 | 6/1964 | France | 74/625 |
| 53-13047 | 2/1978 | Japan | 74/625 |
| 613129 | 11/1948 | United Kingdom | 74/625 |

*Primary Examiner*—Lawrence J. Staab
*Attorney, Agent, or Firm*—Wigman & Cohen

[57] ABSTRACT

An apparatus for feeding a workpiece to a machine is provided which may be driven by either a handcrank or an electric motor. The handcrank and the motor are each coupled to the apparatus by a clutch. The clutch for the handcrank is spring biased to a disengaged condition. A selector lever for engaging the clutch associated with the motor and for actuating the motor is also provided. The selector lever and the handcrank are oriented such that only one of them may be in driving relationship with the apparatus at any one given time.

7 Claims, 7 Drawing Figures

FEEDING APPARATUS FOR MACHINE TOOLS

BACKGROUND OF THE INVENTION

1. Field of the Invention

The present invention relates generally to machine tools such as milling machines and more particularly pertains to feeding apparatus for feeding or moving a workpiece or a movable member such as a work-table holding a workpiece to a desired position in machine tools.

2. Description of the Prior Art

In machine tools such as milling machines, it is necessary to feed or bring a workpiece to be processed to a desired position with regard to a processing tool such as a milling cutter. Particularly in the milling machines, it is necessary to vertically move a work-table holding a workpiece to a milling cutter mounted above the work-table so that the workpiece may be fed into engagement with the milling cutter.

Stated further using milling machines as an example, the work-table holding the workpiece is conventionally so arranged as to be vertically moved by means of a lead screw which is manually rotatable by means of a handwheel or a crank. Also, in order to easily move the work-table, the lead screw for moving the work-table is so arranged as to be rotated alternatively either manually by means of the handwheel or crank or by power in well-developed milling machines. In this arrangement, the lead screw is rotated by power to rapidly bring the work-table near to the milling cutter and it is rotated manually by the handwheel or crank to adjustably feed the workpiece into engagement with the milling cutter.

In the milling machines in which the lead screw for moving the work-table is rotatable manually and by power, the trouble has been that the handwheel or the lever will be often unintentionally rotated when the work-table is to be vertically moved by power. Also, it has been often found that the handwheel or the lever will be unintentionally rotated by power when it is being manually rotated by hand to adjustably feed the workpiece to the milling cutter. Of course, there is a danger of injuring the operator or the milling machine if the handwheel or the lever is unintentionally rotated, especially since it will be rapidly rotated by power. Such unintentional rotation or movement of operating members has been found with regard to other machine tools than the milling machines having feeding apparatus which are arranged more or less in the same manner as the milling machines.

SUMMARY OF THE INVENTION

It is an object of the present invention to provide a feeding apparatus for machine tools such as milling machines by which a workpiece to be processed can be easily fed or brought with safety to a desired position with regard to a processing tool such as a milling cutter.

Particularly, it is an object of the present invention to provide a safe feeding apparatus for machine tools such as milling machines by which a movable member such as a work-table holding a workpiece to be processed can be easily moved manually and by power with safety to a desired position with regard to a processing tool such as a milling cutter.

It is another object of the present invention to provide a feeding apparatus for machine tools such as milling machines which can be easily operated manually and by power but will by no means be unintentionally operated by power.

It is another object of the present invention to provide a feeding apparatus for machine tools such as milling machines which can be easily and safely changed over from manual operation to power operation.

It is a further object of the present invention to provide a compact feeding apparatus for machine tools such as milling machines which embodies the above described features and is simple in construction and compact in size.

It is still further object of the present invention to provide a feeding apparatus for machine tools such as milling machines which embodies the above described features and can be readily mounted onto machine tools such as milling machines even in a retro-fit manner.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENT

Figure 1:
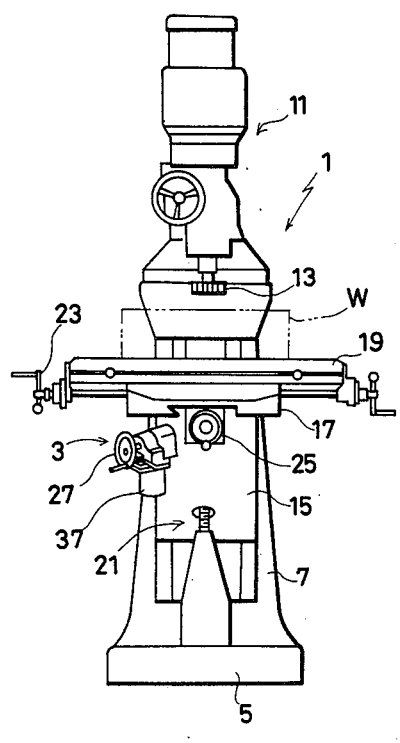
FIG. 1 is a front elevational view of a milling machine in which a feeding apparatus embodying the principles of the present invention has been incorporated.
Figure 2:
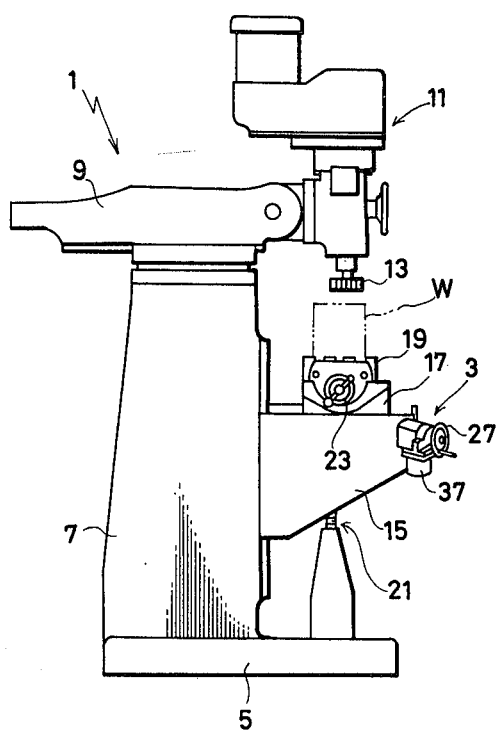
FIG. 2 is a side elevational view of the milling machine shown in FIG. 1.

Referring to FIGS. 1 and 2, the milling machine generally designated by the numeral 1 is shown as having been equipped with the feeding apparatus 3 according to the present invention for the purpose of describing the principles of the present invention. In this connection, however, it is to be initially noted that the feeding apparatus 3 embodying the principles of the present invention can be incorporated in application into other machine tools than milling machines.

As is conventional, the milling machine 1 is constructed of a base 5, a column 7, an over-arm 9 mounted on the column 7, a spindle head 11 held by the over-arm 9 and holding a milling cutter 13 and a knee 15 holding a saddle 17 on which a work-table 19 is movably mounted to hold a workpiece W to be processed. The milling cutter 13 is rotatably disposed on the spindle head 11 to be driven so as to process or cut the workpiece W fed by the work-table 19. The knee 15 carrying the work-table 19 by means of the saddle 17 is vertically slidably mounted on the front portion of the column 7 and it is so arranged as to be vertically moved by a lead screw assembly 21 which is vertically disposed on the base 5. Also, the saddle 17 is equipped with a handle 23 for a longitudinal feed screw and another handle 25 for a cross feed screw to manually feed the work-table 19 holding the workpiece W horizontally namely longitudinally and crossly, although the work-table 19 may be horizontally moved by power in the saddle 17. Thus, in operation, the work-table 19 carrying the workpiece W is firstly vertically raised by operating the lead screw assembly 21 to feed the workpiece W into engagement with the milling cutter 13, and then the work-table 19 is horizontally moved to enable the milling cutter 13 to cut the workpiece W.

In the milling machine 1 described above, the feeding apparatus according to the present invention can be used to operate the lead screw assembly 21 so as to vertically move the knee 15 and the work-table 19 to vertically feed the workpiece W. For such purpose, the feeding apparatus 3 according to the present invention is mounted on the front portion of the knee 15 in the preferred embodiment as shown in FIGS. 1 and 2. In this connection, it is to be noted that the feeding apparatus according to the present invention may be used to horizontally move the work-table 19 to horizontally feed the workpiece W to be processed.

Figure 3:
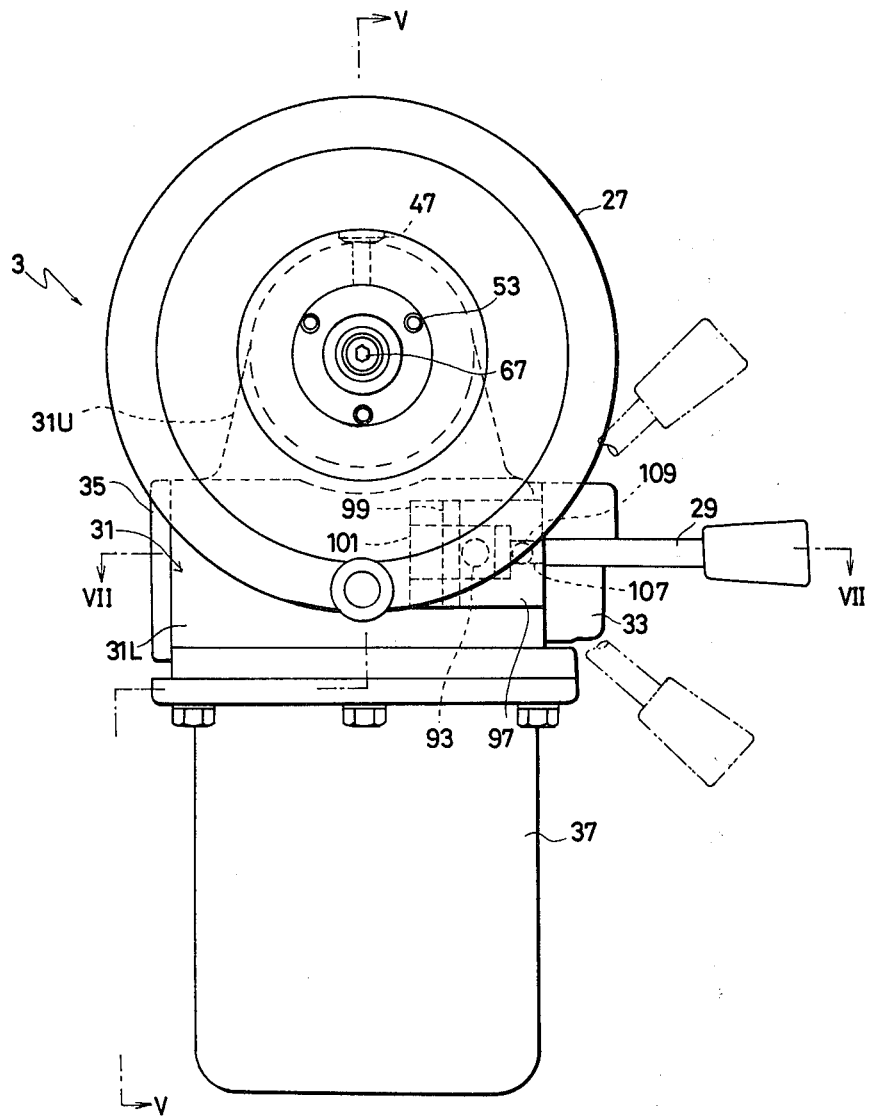
FIG. 3 is a substantially front elevational view of the feeding apparatus embodying the principles of the present invention which is shown in FIGS. 1 and 2 as having been incorporated in the milling machine.
Figure 4:
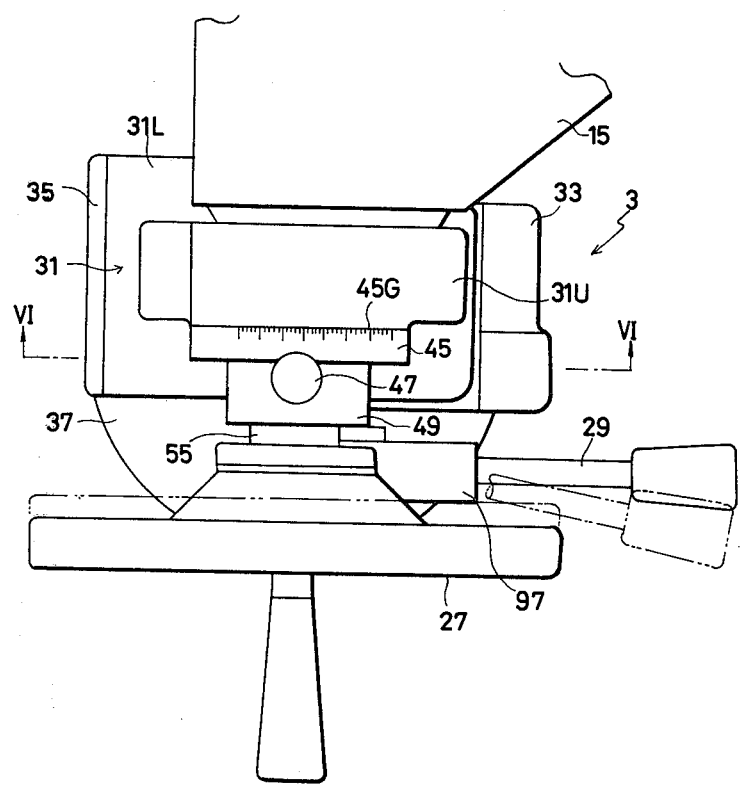
FIG. 4 is a plan view of the apparatus shown in FIG. 3.
Figure 5:
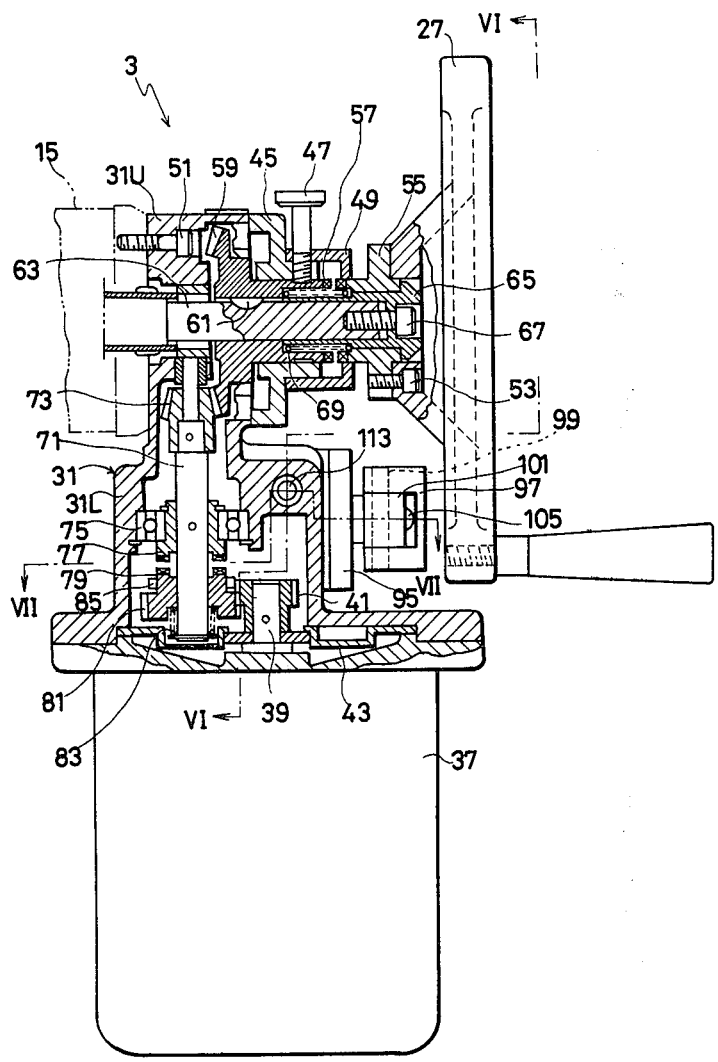
FIG. 5 is a sectional view taken on the plane of the line V—V of FIG. 3.

Referring mainly to FIGS. 3, 4 and 5, the feeding apparatus 3 according to the present invention is provided with a handwheel 27 and a lever 29, and it is constructed of a casing 31 which has an upper cylindrical portion 31U and a lower box-like portion 31L. The lower portion 31L of the casing 31 is closed by cover members 33 and 35 at its sides, and also it is formed open at its bottom and is connected with an electric motor 37 which has an output shaft 39 having a gear 41 and is provided with a ring-like seal member 43 closing the casing 31 as shown in FIG. 5. The electric motor 37 is fixed at the open bottom of the casing 31 in such a manner as to close the casing 31 with its output shaft 39 vertically upwardly projected into the casing 31 through the seal member 43. The upper portion 31U of the casing 31 is also formed open at its front and is closed by a rotatable ring-like gage member 45 which is provided with a gage 45G for reading the rotation of the handwheel 27 and is releasably fixed by a tightening means 47 provided on a sleeve-like cover member 49. Also, the casing 31 is fixed to the front portion of the knee 15 of the milling machine 1 by a plurality of tightening means 51 such as bolts at its upper portion 31U as shown in FIG. 5.

As shown in FIG. 5, the handwheel 27 is integrally fixed by a plurality of bolts 53 with a clutch member 55 which is rotatable and axially movable and is arranged to engage with another clutch member 57 provided at its back with a coaxial bevel gear 59. The clutch member 57 is fixed by a key member 61 to a shaft 63 which is horizontally and rotatably disposed with its ends projected out of the casing 31 and is connected at its inner end with the lead screw assembly 21 so as to operate the same when rotated. The clutch member 55 fixed with the handwheel 27 is rotatably and axially slidably disposed on a sleeve member 65 which is fixed to the outer end of the shaft 63 by a bolt 67. The sleeve member 65 is so arranged as to allow the clutch member 55 to move thereon into and out of engagement with the clutch member 57 but prevent the same from getting off therefrom. Also, the clutch member 55 is normally kept biased out of engagement with the clutch member 57 by a spring 69 which is a helical spring surrounding the shaft 63 in the preferred embodiment. Thus, the clutch member 55 will be moved into engagement with the clutch member 57 against the spring 69 when the handwheel 27 is axially pushed by hand, and the shaft 63 will be rotated when the handwheel 27 is manually rotated with the clutch member 55 and 57 engaged with each other. Of course, it will be readily apparent that the knee 15 of the milling machine 1 will be vertically moved together with the work-table 19 holding the workpiece W by rotating the shaft 63 which is connected with the lead screw assembly 21 to operate the same.

In order to enable the shaft 63 to be driven by the electric motor 37, a drive shaft 71 having a bevel gear 73 is disposed perpendicular to the shaft 63 with its bevel gear 73 engaged with the bevel gear 59 so as to downwardly extend to the lower end of the casing 31. The drive shaft 71 is rotatably journaled in a bearing 75, and it is provided with a clutch member 77 which is fixed thereto and is designed to engage with another clutch member 79 provided at its periphery with a gear 81. The clutch member 79 is rotatably and axially movably disposed around the lower end of the drive shaft 71 in a manner such that the gear 81 may be kept in engagement with the gear 41 which is fixed at the output shaft 39 of the electric motor 37. Thus, the clutch member 79 can be moved into and out of engagement with the clutch member 77 along the drive shaft 71, but the gear 81 is kept in engagement with the gear 41. Also, the clutch member 79 is kept biased toward the clutch member 77 by a spring 83 such as a helical spring, but it is normally kept out of engagement with the clutch member 77 against the spring 83 by a fork-like member 85. As seen from FIGS. 6 and 7, the fork-like member 85 is pivotally supported by a horizontally disposed pin 87 and is provided with a cam follower 89 which will be described in detail hereinafter.

From the above description, it will be understood that the shaft 63 will be driven by the electric motor 37 through the gears 41 and 81, the clutch members 79 and 77, the drive shaft 71 and the bevel gears 73 and 59 when the fork-like member 85 allows the clutch member 79 to be moved by the spring 83 into engagement with the clutch member 77.

Figure 6:
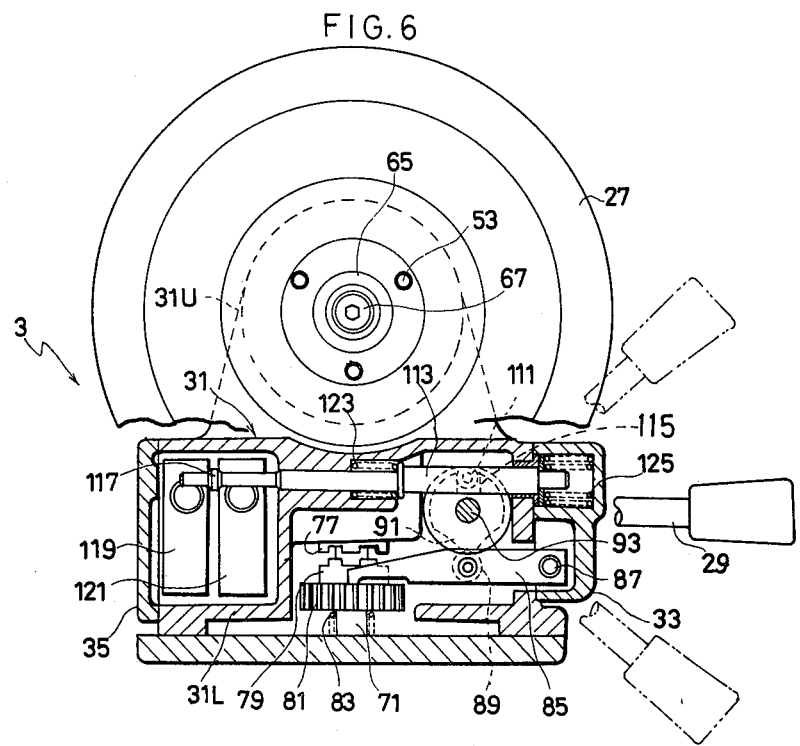
FIG. 6 is a sectional view of the feeding apparatus shown in FIG. 3 which has been taken on the plane of the line VI—VI of FIG. 5 and also roughly along the line VI—VI of FIG. 4.
Figure 7:
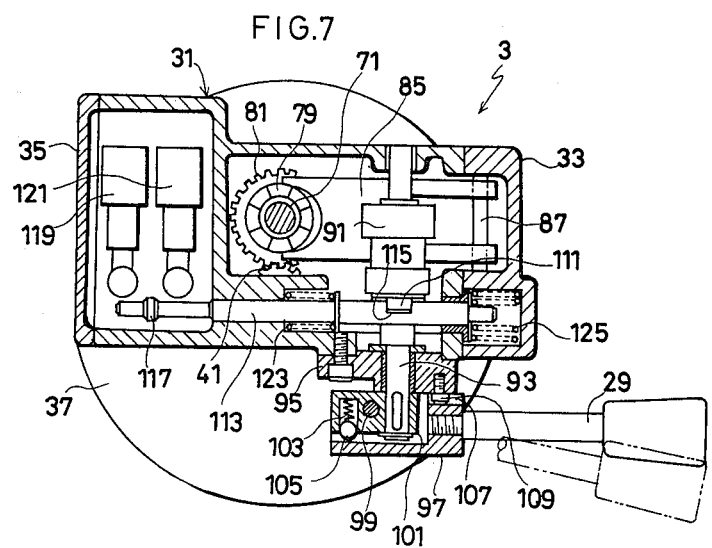
FIG. 7 is a sectional view of the feeding apparatus shown in FIG. 3 which has been taken on the plane of the line VII—VII of FIG. 5 and also roughly along the line VII—VII of FIG. 3.

Referring detailedly to FIGS. 6 and 7, the fork-like member 85 keeping the clutch member 77 out of engagement with the clutch member 79 is so arranged as to be operated by a cam member 91 having a shaft 93 fixed thereto. The shaft 93 of the cam member 91 is rotatably disposed in the lower portion 31L of the casing 31 with its end frontwardly projected out of the casing 31 and supported by a support member 95 fixed to the casing 31 so that it may be operated by the lever member 29. The cam member 91 itself is so formed as to normally force the fork-like member 85 by means of the cam follower 89 to press the clutch member 79 out of engagement with the clutch member 77 against the spring 83 but allow the fork-like member 85 to release the clutch member 79 when rotated in either direction. Thus, when the cam member 91 is rotated in either direction from the normal position, the fork-like member 85 will allow the clutch member 79 to be brought into engagement with the clutch member 77 by the spring 83.

As best shown in FIG. 7, in order to operate the shaft 93 of the cam member 91, the lever 29 is fixed to the box-like turning member 97, and it is connected by means of a hinge pin 99 to a holding member 101 which is secured to the outer end of the shaft 93 of the cam member 91. The hinge pin 99 is fixed to the holding member 101 in perpendicular relation with the shaft 93 of the cam member 91 to pivotally hold the turning member 97 so that the lever 29 fixed to the turning member 97 may be swung around the hinge pin 99. Specifically, the turning member 97 is so arranged as to be held by the hinge pin 99 in such a manner as to normally remain in contact with the front face of the support member 95 fixed to the casing 31 and be swung away from the support member 95 when the lever 27 is pulled frontward. In this arrangement, the turning member 97 is kept biased around the hinge pin 99 into contact with the support member 95 by a spring 103 and a ball member 105 which are provided on the holding member 101. Also, the turning member 97 is provided at its inner side with a groove 107, and a pin 109 is fixed to the support member 95 so that it may engage with the groove 107 when the turning member 97 is held in contact with the support member 95. Thus, the turning member 97 is locked by the pin 109 and is kept stopped from turning to rotate the shaft 93 of the cam member 91 when it is kept in contact with the support member 95 by the spring 103 and the ball member 105. However, it will be readily understood that the turning member 97 can be turned together with the lever 29 to rotate the shaft 93 of the cam member 91 by means of the holding member 101 when the lever 29 is pulled frontward to swing the turning member 97 around the hinge pin 99 out of engagement with the pin 109.

As the matter of importance, the lever 29 arranged as described above is also so disposed that it will be stopped by the handwheel 27 from being pulled frontward to engage the turning member 97 to rotate the shaft 93 of the cam member 91 when the handwheel 27 is pushed to the clutch members 55 and 57. More particularly, the handwheel 27 and the lever 29 are so located with regard to each other that each of them is stopped by the other from being moved as shown by the imaginary lines in FIG. 4 when the latter is moved. In other words, the handwheel 27 and the lever 29 are so disposed that they will be moved to the same vertical plane as shown by the imaginary lines in FIG. 4 and they may by no means be simultaneously moved at the same time. Therefore, the handwheel 27 is also stopped by the lever 29 from being pushed to engage the clutch members 55 and 57 when the lever 29 is pulled frontward to enable the turning member 97 to rotate the cam member 91.

As best shown in FIGS. 6 and 7, the cam member 91 is provided at its eccentric portion with a pin member 111 axially projecting, and there is provided an elongate shaft member 113 which is provided with hole 115 engaged by the pin member 111. The shaft member 113 is horizontally disposed in the lower portion of the casing 31 so that it may be horizontally moved by the pin member 111 in either direction when the cam member 91 is rotated together with the shaft 93 in either direction. Also, the shaft member 113 is provided at its end with a dog member 117, and there are provided two limit switches 119 and 121 which are so arranged as to be actuated by the dog member 117 to put the electric motor 37 into normal or reverse motion. In this arrangement, the pin member 111 is so arranged as to move the shaft 113 to enable the dog member 117 to actuate either of the limit switches 119 and 121 only when the cam member 91 is rotated to release the fork-like member 85. Also, the shaft member 113 is kept biased by springs 123 and 125 at its end to normally keep the cam member 91 pressing the fork-like member 85 against the spring 83 by means of the pin member 111.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. Apparatus for feeding a workpiece to a machine, either manually or by power means, comprising:
   a work table means for securing said workpiece to said machine;
   lead screw means, the rotation of which changes the vertical height of said work table means;
   power driving means selectively connectable to said screw means;
   manual driving means selectively connectable to said screw means;
   selector means operatively connected to actuate said power driving means;
   means attached to said manual driving means such that when said work table means is moved by said manual driving means, said power driving means is rendered inoperable;
   wherein said manual driving means comprises:
   a handwheel attached to a shaft;
   said shaft being operatively connected to said lead screw means;
   spring biased clutch means, disposed about said shaft, for selectively connecting said handwheel to drive said lead screw means;
      wherein said handwheel is operatively connected to said lead screw means when said handwheel is axially shifted along said shaft; and
      wherein the operative position of said handwheel and the operative position of said selector means are such that they occupy the same vertical plane in space, whereby only one of said manual and power driving means may be driving said lead screw means at any given time.

2. Apparatus for feeding a workpiece to a machine, either manually or by power means, comprising:
   a work table means for securing said workpiece to said machine;
   lead screw means, the rotation of which changes the vertical height of said work table means;
   power driving means selectively connectable to said screw means;
   manual driving means selectively connectable to said screw means;
   selector means operatively connected to actuate said power driving means;
   means attached to said manual driving means such that when said work table means is moved by said manual driving means, said power driving means is rendered inoperable;
   wherein said power driving means comprises:
   an electric motor having an output shaft;
   a motor drive shaft operatively connected to said lead screw means;
   clutch means, disposed about said motor drive shaft, for selectively engaging said output shaft with said motor drive shaft;
   wherein said manual driving means comprises:
   a handwheel attached to a shaft;

said shaft being operatively connected to said lead screw means;

spring biased clutch means, disposed about said shaft, for selectively connecting said handwheel to drive said lead screw means;

wherein said handwheel is operatively connected to said lead screw means when said handwheel is axially shifted along said shaft; and wherein the operative position of said handwheel and the operative position of said selector means are such that they occupy the same vertical plane in space, whereby only one of said manual and power driving means may be driving said lead screw means at any given time.

3. The apparatus of claim 2, further including fork means, connected between said clutch means and actuated by said selector means, for engaging said power driving means for driving said lead screw means.

4. The apparatus of claim 3, wherein said selector means comprises:

a cam shaft having eccentric cam means attached to one end thereof;

selector lever means, operatively attached to said cam shaft, for rotating said eccentric cam means attached to said cam shaft; and said eccentric cam means contacting said fork means in order to allow engagement and disengagement of said clutch means upon rotation of said cam shaft by said selector lever means.

5. The apparatus of claim 4, wherein said motor drive clutch means are spring biased such that rotation of said eccentric cam means allows the engagement of said clutch means.

6. The apparatus of claim 4, further including:

pin means axially projecting from said eccentric cam means;

a second shaft member disposed perpendicular to said cam shaft;

a bore means, disposed in said second shaft for engagement by said pin means, for horizontally moving said second shaft member upon rotation of said eccentric cam means;

dog means disposed on the opposite end of said second shaft from said bore means; and two limit switches disposed proximate to said dog means such that, upon horizontal movement of said second shaft, caused by the rotation of said cam shaft by said selector means, said dog means contacts one of said limit switches.

7. The apparatus of claim 6, wherein one of said limit switches causes the actuation of said electric motor in a normal direction and actuation of the other causes actuation of said electric motor in a reverse direction.

* * * * *

UNITED STATES PATENT AND TRADEMARK OFFICE
CERTIFICATE OF CORRECTION

PATENT NO. : 4,342,237
DATED : August 3, 1982
INVENTOR(S) : Kikuo Tsutsui

It is certified that error appears in the above—identified patent and that said Letters Patent is hereby corrected as shown below:

Claim 5, line 1, "motor drive" should be deleted.

Signed and Sealed this

Eighteenth Day of January 1983

[SEAL]

Attest:

Attesting Officer

GERALD J. MOSSINGHOFF

Commissioner of Patents and Trademarks